United States Patent
DelaCruz et al.

(10) Patent No.: US 7,027,952 B2
(45) Date of Patent: Apr. 11, 2006

(54) DATA TRANSMISSION METHOD FOR A MULTI-PROTOCOL HANDHELD FIELD MAINTENANCE TOOL

(75) Inventors: Moises A. DelaCruz, Cottage Grove, MN (US); Daniel E. Vande Vusse, Savage, MN (US); Kun Yang, Eden Prairie, MN (US); Alan R. Dewey, Plymouth, MN (US); Gregory J. Opheim, St. Paul, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 10/440,434

(22) Filed: May 16, 2003

(65) Prior Publication Data

US 2004/0073402 A1   Apr. 15, 2004

Related U.S. Application Data

(63) Continuation-in-part of application No. 10/097,084, filed on Mar. 12, 2002, now Pat. No. 6,629,059.

(51) Int. Cl.
    *G06F 11/30* (2006.01)
(52) U.S. Cl. .................. 702/183; 455/557
(58) Field of Classification Search ............... 702/183, 702/188; 455/557; 315/224; 700/79, 2, 700/26, 37; 370/352; 706/25; 709/201; 713/1; 714/34
See application file for complete search history.

(56) References Cited

U.S. PATENT DOCUMENTS

| | | | |
|---|---|---|---|
| 4,337,516 A | 6/1982 | Murphy et al. | 364/551 |
| 4,630,265 A | 12/1986 | Sexton | 370/86 |
| 4,635,214 A | 1/1987 | Kasai et al. | 364/551 |
| 4,707,796 A | 11/1987 | Calabro et al. | 364/552 |
| 4,954,923 A | 9/1990 | Hoeflich et al. | 361/111 |
| 4,964,125 A | 10/1990 | Kim | 371/15.1 |
| 4,988,990 A | 1/1991 | Warrior | 340/25.5 |
| 5,005,142 A | 4/1991 | Lipchak et al. | 364/550 |
| 5,103,409 A | 4/1992 | Shimizu et al. | 364/556 |
| 5,113,303 A | 5/1992 | Herres | 361/45 |

(Continued)

FOREIGN PATENT DOCUMENTS

DE       29917651       12/2000

(Continued)

OTHER PUBLICATIONS

U.S. Appl. No. 09/384,876, filed Aug. 27, 1999, Eryurek et al.

(Continued)

*Primary Examiner*—John Barlow
*Assistant Examiner*—Xiuqin Sun
(74) *Attorney, Agent, or Firm*—Westman, Champlin & Kelly, P.A.

(57) ABSTRACT

A method for preventing unsafe transmission on an incompatible network with a multi-protocol intrinsically safe handheld field maintenance tool as provided. The method preferably includes checking voltage levels on two sets of network connections when a network connection is detected or indicated on one set. If incompatible voltage levels are detected, the field technician is warned. If voltage levels are appropriate on a selected set of network terminals, the method continues by listening for network traffic of the selected network type. In this manner, a multi-protocol intrinsically safe handheld field maintenance tool is operable with multiple process control communication protocols while minimizing the risk of incompatible data/signal transmission upon process communication loops.

16 Claims, 3 Drawing Sheets

U.S. PATENT DOCUMENTS

| | | | |
|---|---|---|---|
| 5,148,378 A | 9/1992 | Shibayama et al. ..... 364/571.07 |
| 5,150,289 A | 9/1992 | Badavas ..................... 364/154 |
| 5,197,328 A | 3/1993 | Fitzgerald ..................... 73/168 |
| 5,426,774 A | 6/1995 | Banerjee et al. ............. 395/575 |
| 5,434,774 A | 7/1995 | Seberger ..................... 364/172 |
| 5,442,639 A | 8/1995 | Crowder et al. ............ 371/20.1 |
| 5,469,156 A | 11/1995 | Kogure .................. 340/870.38 |
| 5,481,200 A | 1/1996 | Voegele et al. .............. 324/718 |
| 5,570,300 A | 10/1996 | Henry et al. ............ 364/551.01 |
| 5,573,032 A | 11/1996 | Lenz et al. .................. 137/486 |
| 5,598,521 A | 1/1997 | Kilgore et al. .............. 395/326 |
| 5,623,605 A | 4/1997 | Keshav et al. ......... 395/200.17 |
| 5,665,899 A | 9/1997 | Willcox ....................... 73/1.63 |
| 5,742,845 A | 4/1998 | Wagner ...................... 395/831 |
| 5,752,249 A | 5/1998 | Macon, Jr. et al. ......... 707/103 |
| 5,764,891 A | 6/1998 | Warrior ................... 395/200.2 |
| 5,828,567 A | 10/1998 | Eryurek et al. .............. 364/184 |
| 5,838,187 A | 11/1998 | Embree ....................... 327/512 |
| 5,909,368 A | 6/1999 | Nixon et al. ................. 364/131 |
| 5,923,557 A | 7/1999 | Eidson .................. 364/471.03 |
| 5,940,290 A | 8/1999 | Dixon .......................... 364/138 |
| 5,956,663 A | 9/1999 | Eryurek ...................... 702/183 |
| 5,960,214 A | 9/1999 | Sharpe, Jr. et al. ......... 395/835 |
| 5,970,430 A | 10/1999 | Burns et al. ................. 702/122 |
| 5,980,078 A | 11/1999 | Krivoshein et al. ......... 364/131 |
| 5,995,916 A | 11/1999 | Nixon et al. ................. 702/182 |
| 6,017,143 A | 1/2000 | Eryurek et al. ........ 364/148.06 |
| 6,023,399 A | 2/2000 | Kogure ......................... 364/23 |
| 6,026,352 A | 2/2000 | Burns et al. ................. 702/182 |
| 6,047,222 A | 4/2000 | Burns et al. ................... 700/79 |
| 6,052,655 A | 4/2000 | Kobayashi et al. ......... 702/184 |
| 6,091,968 A * | 7/2000 | Koohgoli et al. ............ 455/557 |
| 6,094,600 A | 7/2000 | Sharpe, Jr. et al. ........... 700/19 |
| 6,111,738 A | 8/2000 | McGoogan ................ 361/91.5 |
| 6,119,047 A | 9/2000 | Eryurek et al. .............. 700/28 |
| 6,179,964 B1 | 1/2001 | Begemann et al. ......... 162/198 |
| 6,192,281 B1 | 2/2001 | Brown et al. ................... 700/2 |
| 6,195,591 B1 | 2/2001 | Nixon et al. ................... 700/83 |
| 6,211,623 B1* | 4/2001 | Wilhelm et al. ............. 315/224 |
| 6,236,334 B1 | 5/2001 | Tapperson et al. ..... 340/825.37 |
| 6,263,487 B1 | 7/2001 | Stripf et al. .................... 717/1 |
| 6,270,920 B1 | 8/2001 | Nakanishi et al. .......... 429/163 |
| 6,298,377 B1 | 10/2001 | Hartikainen et al. ........ 709/223 |
| 6,304,934 B1 | 10/2001 | Pimenta et al. .............. 710/129 |
| 6,307,483 B1 | 10/2001 | Westfield et al. ...... 340/870.11 |
| 6,317,701 B1 | 11/2001 | Pyotsia et al. ............... 702/188 |
| 6,324,607 B1 | 11/2001 | Korowitz et al. ............ 710/102 |
| 6,356,191 B1 | 3/2002 | Kirkpatrick et al. ........ 340/501 |
| 6,370,448 B1 | 4/2002 | Eryurek ....................... 700/282 |
| 6,377,859 B1* | 4/2002 | Brown et al. ................... 700/79 |
| 6,397,114 B1 | 5/2002 | Eryurek et al. ................ 700/51 |
| 6,434,504 B1 | 8/2002 | Eryurek et al. .............. 702/130 |
| 6,444,350 B1 | 9/2002 | Toya et al. ..................... 429/90 |
| 6,449,574 B1 | 9/2002 | Eryurek et al. ................ 702/99 |
| 6,473,710 B1 | 10/2002 | Eryurek ....................... 702/133 |
| 6,487,462 B1 | 11/2002 | Reeves ......................... 700/73 |
| 6,505,517 B1 | 1/2003 | Eryurek et al. ........... 73/861.08 |
| 6,519,546 B1 | 2/2003 | Eryurek et al. .............. 702/130 |
| 6,532,392 B1 | 3/2003 | Eryurek et al. ................ 700/54 |
| 6,539,267 B1 | 3/2003 | Eryurek et al. ................ 700/51 |
| 6,594,603 B1 | 7/2003 | Eryurek et al. .............. 702/104 |
| 6,594,621 B1 | 7/2003 | Meeker ....................... 702/185 |
| 6,598,828 B1 | 7/2003 | Fiebick et al. ............. 244/118.1 |
| 6,601,005 B1 | 7/2003 | Eryurek et al. .............. 702/104 |
| 6,611,775 B1 | 8/2003 | Coursolle et al. ............. 702/65 |
| 6,615,149 B1 | 9/2003 | Wehrs .......................... 702/76 |
| 6,629,059 B1 | 9/2003 | Borgeson et al. ........... 702/183 |
| 6,654,697 B1 | 11/2003 | Eryurek et al. ................ 702/47 |
| 6,697,681 B1 | 2/2004 | Stoddard et al. .............. 700/17 |
| 6,775,271 B1* | 8/2004 | Johnson et al. ............. 370/352 |
| 2001/0053065 A1 | 12/2001 | Cudini et al. ................ 361/728 |
| 2002/0004370 A1 | 1/2002 | Stengele et al. |
| 2002/0065631 A1 | 5/2002 | Loechner |
| 2002/0077711 A1 | 6/2002 | Nixon et al. |
| 2002/0123864 A1 | 9/2002 | Eryurek et al. |
| 2003/0023408 A1 | 1/2003 | Wight et al. |
| 2003/0023795 A1 | 1/2003 | Packwood et al. |
| 2003/0033040 A1 | 2/2003 | Billings ........................ 700/97 |
| 2003/0158795 A1 | 8/2003 | Markham et al. |

FOREIGN PATENT DOCUMENTS

| | | |
|---|---|---|
| DE | 1993 0660 A1 | 1/2001 |
| EP | 1022626 A2 | 7/2000 |
| GB | 2347232 | 8/2000 |
| JP | 2753592 | 1/1990 |
| WO | WO/96/12993 | 5/1996 |
| WO | WO/97/21157 | 6/1997 |
| WO | WO/98/39718 | 9/1998 |
| WO | WO/00/41050 | 7/2000 |
| WO | WO 00/55700 | 9/2000 |
| WO | WO/02/027418 | 4/2002 |

OTHER PUBLICATIONS

U.S. Appl. No. 09/409,098, filed Sep. 30, 1999, Eryurek et al.
U.S. Appl. No. 09/799,824, filed Mar. 5, 2001, Rome et al.
U.S. Appl. No. 09/852,102, filed May 9, 2001, Eryurek et al.
U.S. Appl. No. 09/855,179, filed May 14, 2001, Eryurek et al.
U.S. Appl. No. 10/790,627, filed Mar. 6, 2003, Mathiowetz.
U.S. Appl. No. 10/438,386, filed Mar. 1, 2004, Mathiowetz et al.
U.S. Appl. No. 10/440,047, filed May 16, 2003, Kantzes et al.
U.S. Appl. No. 10/426,894, filed Apr. 30, 2003, Duren et al.
U.S. Appl. No. 10/438,401, filed May 16, 2003, Opheim et al.
U.S. Appl. No. 10/440,434, filed May 16, 2003, DelaCruz et al.
U.S. Appl. No. 10/435,819, filed May 12, 2003, Kantzes et al.
U.S. Appl. No. 10/440,048, filed May 16, 2003, Duren et al.
U.S. Appl. No. 10/440,444, filed May 16, 2003, Mathiowetz et al.
U.S. Appl. No. 10/439,660, filed May 16, 2003, Mathiowetz et al.
U.S. Appl. No. 10/439,764, filed May 16, 2003, Mathiowetz.
U.S. Appl. No. 10/310,703, filed Dec. 5, 2002, Zielinski et al.
U.S. Appl. No. 10/440,041, filed May 16, 2003, Mathiowetz et al.
U.S. Appl. No. 10/440,441, filed May 16, 2003, Mathiowetz et al.
"Fluke 179 Multimeter & ToolPak Combo Pack,"http://www.fluke.com/ MULTIMETER/TOOLPAK .ASP?AGID=6&SID=260 (2 pages).
"Multifunction PDA Calibrator Transmation Model 3-PMF1," Transmation, Apr. 2001.
"AAPA 60 & 90 Series Multimeter," http://www.appatech.com/a-60new.htm (5 pages).
"Fieldbus Standard for Use in Industrial Control Systems Part 2: Physical Layer Specification and Service Definition", ISA-S50.Feb. 1992, pp. 1-93.
Hart Communications, Technical Information, Part 4 Communications, Samson, Frankfurt.

"Fieldbus Brings Protocol to Process Control," Santori et al., IEEE Spectrum, vol. 33, Issue 3, Mar. 1996, pps. 60-64.

"Computerized Maintenance systems-an Overview of Two Basic Types for Field Devices," Medlin, IEEE Pulp and Pater Industry Technical Conference, Jun. 21-25, 1999, pps. 230-232.

"Fieldbus in the Process Control Laboratory-its Time has Come," Rehg. et al., ASEE/IEEE Frontiers in Education Conference, vol. 3, Nov. 1999, pps. 13B4/12-13B4/17.

"Generic Device Description for Complex HART Field Devices," Zulkifi et al., IEE 8th International Conference on Communication Systems, vol. 2, Nov. 25-28, 2002, pps. 646-650.

"SFC Smart Field Communicator-Model STS103," Honeywell, Specification, Dec. 1995, pps. 1-4.

"SFC Smart Field Communicator-Models SFC160/SFC260," Yamatake, Specification Apr. 1999, pps. 1-6.

"HART Communicator," Fisher-Rosemount, Product Manual, Jul. 2000, pps. i-iv, ix-x, 1-1, -1-40—2-1—2-8—3-1—3-38—A-1—A-6—B-1—B-6  C-1—C-4—D-1—D-4 and I-1 1-2.

Shoji et al., Fieldbus System Engineering, 1999, Yokogawa Technical Report.

Diedrich et al., Field Device Integration in DCS Engineering Using a Device Model, 1998, IEEE.

Dewey, Fieldbus Device Maintenance—Do I Need To Go to the Field Anymore?, The Instrumentation, Systems and Automation Society, ISA 2000.

Simon et al., Field Devices—Models and Their Realizations, Dec. 11-14, 2002, Industrial Technology, IEEE ICIT 2002, IEEE International Conference, vol. 1, pp. 307-312.

* cited by examiner

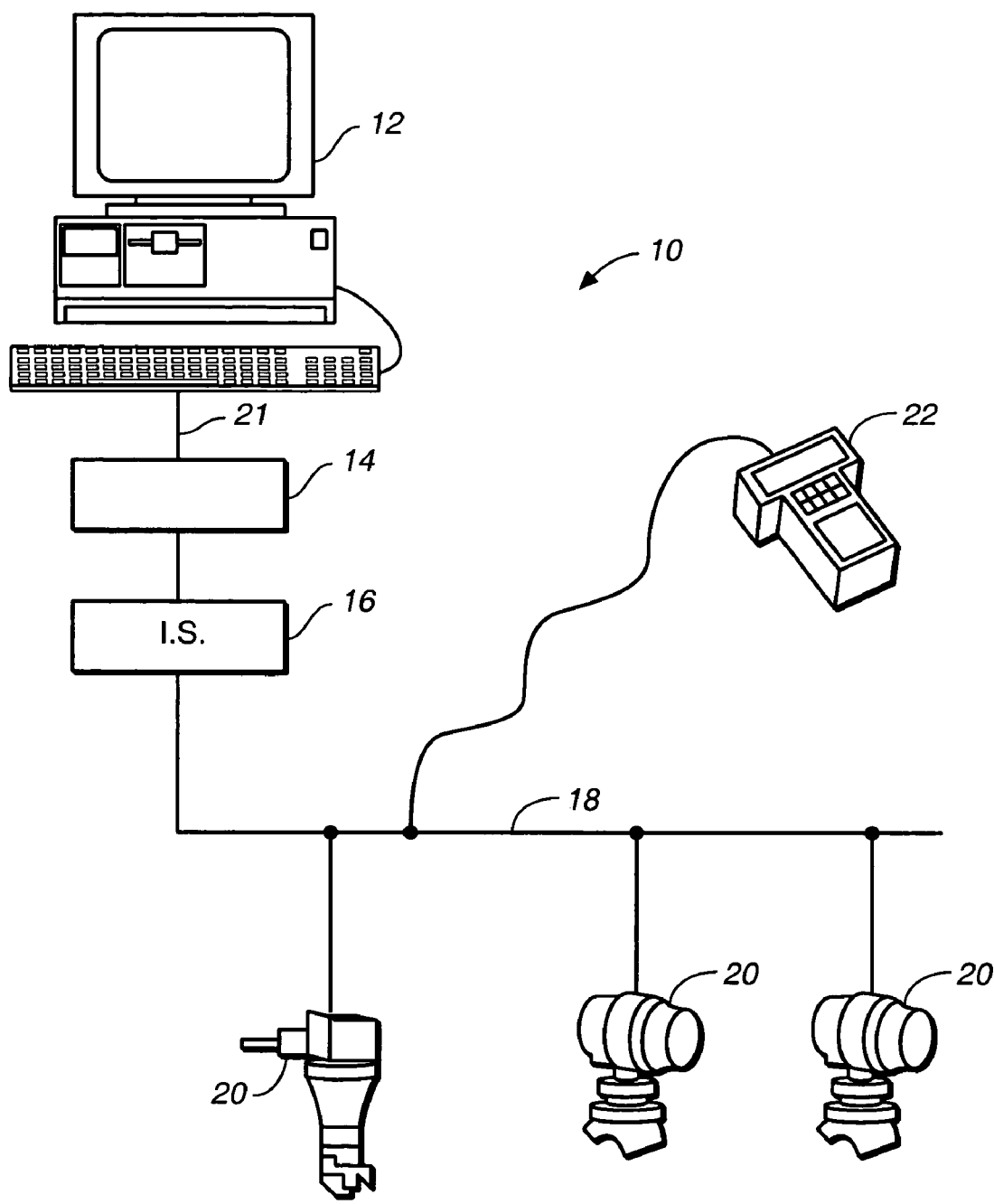
FIG._1

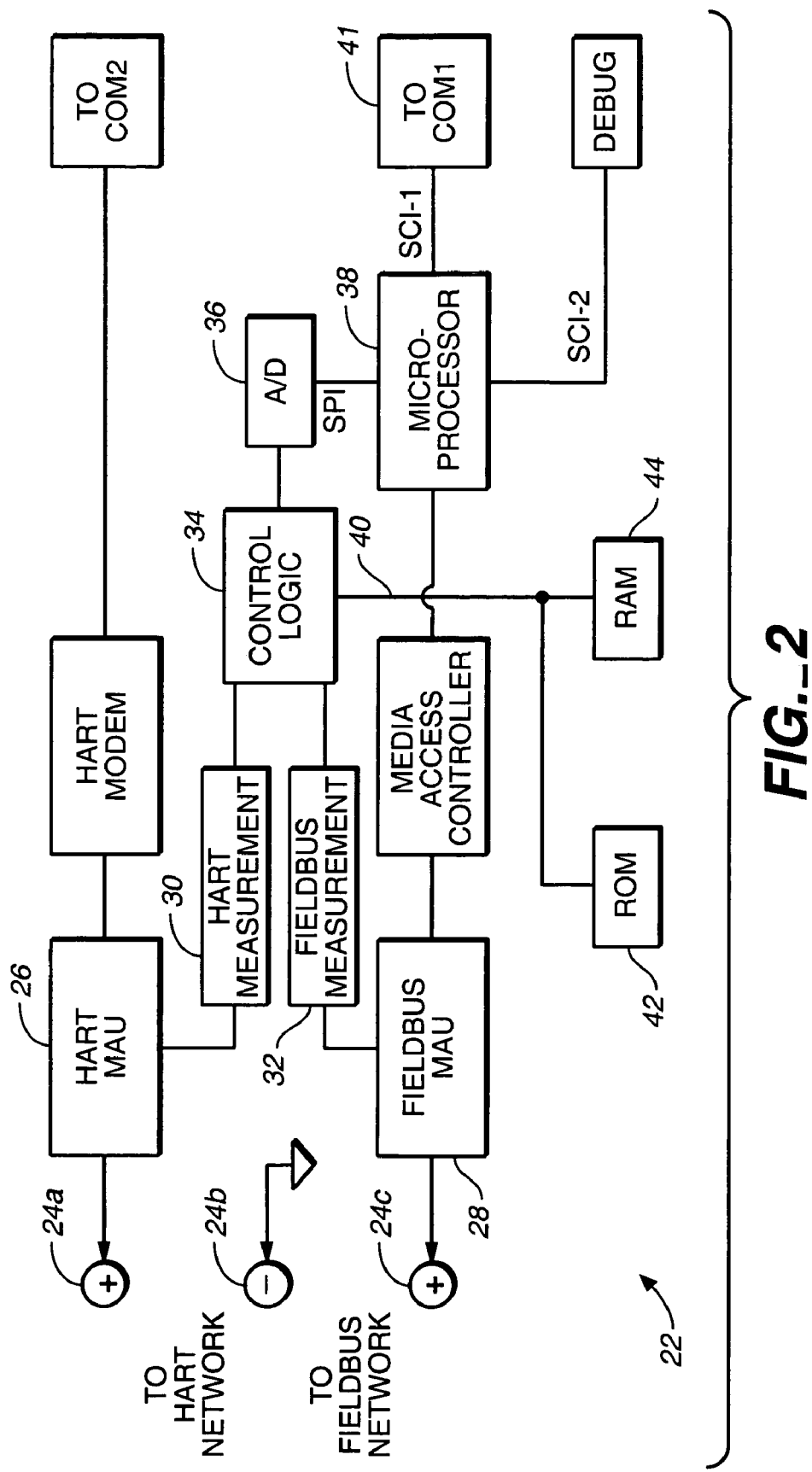
FIG._2

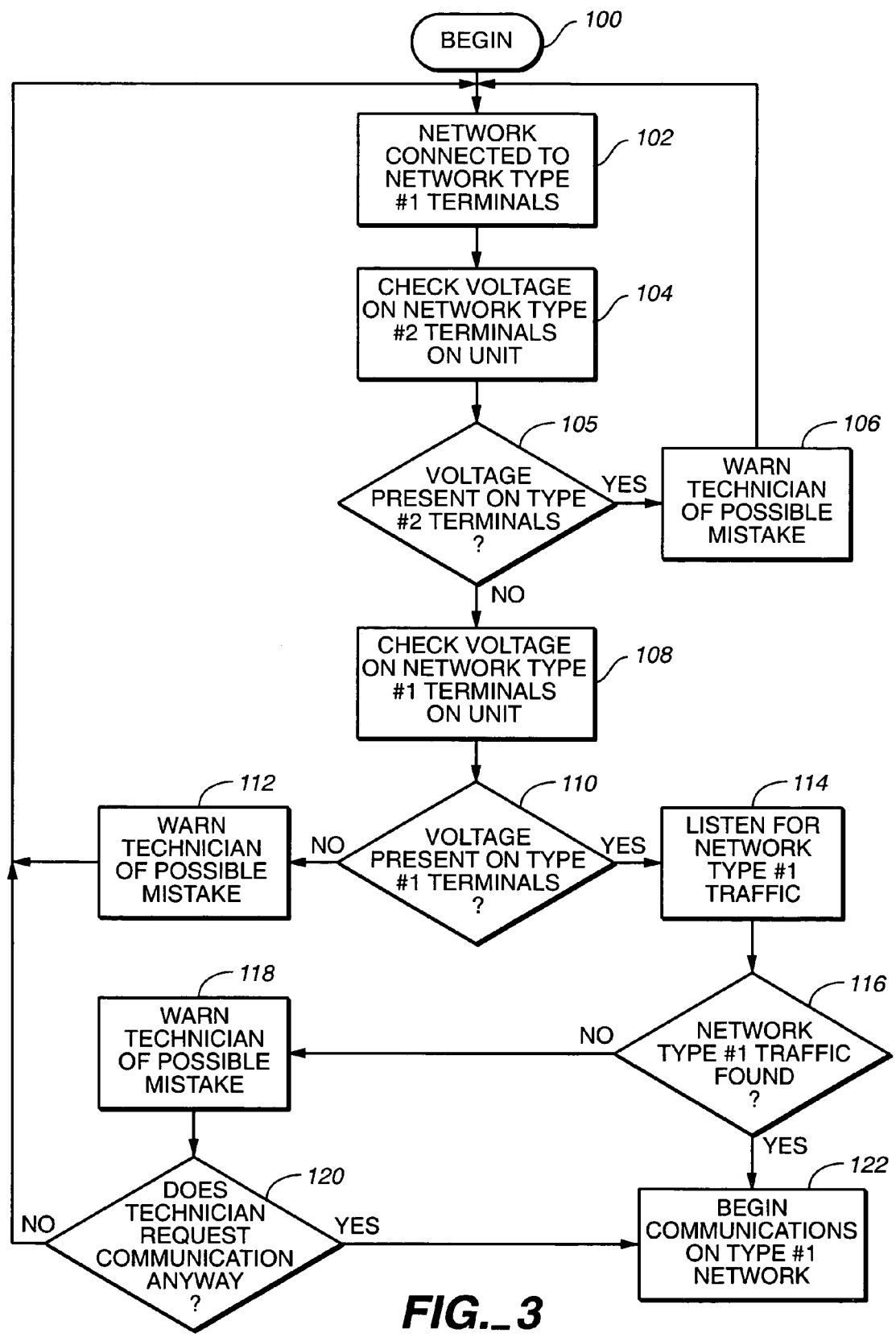
FIG._3

DATA TRANSMISSION METHOD FOR A MULTI-PROTOCOL HANDHELD FIELD MAINTENANCE TOOL

CROSS REFERENCE TO RELATED APPLICATIONS

The present application is a continuation-in-part of U.S. patent application Ser. No. 10/097,084 filed Mar. 12, 2002, now U.S. Pat. No. 6,629,059, entitled HAND HELD DIAGNOSTIC AND COMMUNICATION DEVICE WITH AUTOMATIC BUS DETECTION.

BACKGROUND OF THE INVENTION

The present invention relates to process control and measurement. More specifically, the present invention relates to a handheld field maintenance tool for use in conjunction with process control measurement systems.

Handheld field maintenance tools are known. One example of such a device is the Model 275 Highway Addressable Remote Transducer (HART) communicator. The HART communicator is a handheld tool that provides a common communication link to all HART-compatible, microprocessor-based field instruments (or process devices). The HART communicator interfaces with HART compatible devices and communicates using the Bell 202 frequency shift key (FSK) technique of providing high-frequency digital signals superimposed on a standard transmitter current loop of 4–20 mA. The HART communicator provides a number of known diagnostic and communication functions which facilitate maintenance of the process devices. In fact, the HART communicator can streamline regulatory documentation preparation through access to historic configuration and as found/as left data. While the HART Model 275 communicator is recognized as a valuable asset to the maintenance of process control instrumentation, it is slightly limited in one regard. Specifically, the Model 275 can only be used in conjunction with HART-compatible process devices. Additional tools are also available for other process industry protocols, but to date, no one has provided an effective handheld tool that can be used in conjunction with process industry protocols having different physical layer specifications.

In a process control installation employing process devices communicating in accordance with varying physical layer specifications, maintenance technicians would be forced to carry multiple protocol-specific handheld tools to interact with each and every device of a distinct protocol. While such a situation is undesirable, the solution is either to standardize upon a single process industry protocol, or work with one set of process industry protocol devices at a time.

A handheld field maintenance tool that could operate on different process communication loops having differing physical specifications would facilitate process device maintenance and allow a technician to access varying devices without the necessity of having to carry around multiple handheld tools. One of the primary technical hurdles to building such a tool is the different physical layer specifications themselves. For example, a handheld tool adapted to communicate in accordance with one physical layer specification may actually cause damage if employed upon a process control loop requiring a different specification. A handheld tool that solves the above technical hurdles and provides use for different physical layer specifications would vastly simplify the maintenance of process control devices.

SUMMARY OF THE INVENTION

A method for preventing unsafe transmission on an incompatible network with a multi-protocol intrinsically safe handheld field maintenance tool as provided. The method preferably includes checking voltage levels on two sets of network connections when a network connection is detected or indicated on one set. If incompatible voltage levels are detected, the field technician is warned. If voltage levels are appropriate on a selected set of network terminals, the method continues by listening for network traffic of the selected network type. In this manner, a multi-protocol intrinsically safe handheld field maintenance tool is operable with multiple process control communication protocols while minimizing the risk of incompatible data/signal transmission upon process communication loops.

BRIEF DESCRIPTION OF THE DRAWINGS

FIG. 1 is a diagrammatic view of a process measurement and control system for which embodiments of the present invention are particularly useful.

FIG. 2 is a system block diagram of a portion of a hand-held communication and diagnostic device in accordance with an embodiment of the present invention.

FIG. 3 is a method of ensuring a compatible process communication network in accordance with embodiment of the present invention.

DETAILED DESCRIPTION OF THE PREFERRED EMBODIMENTS

FIG. 1 illustrates an exemplary system in which embodiments of the present invention are useful. System 10 includes controller 12, I/O and control sub-system 14, intrinsic safety (IS) barrier 16, process communication loop 18 and field devices 20. Controller 12 is coupled to I/O and control sub-system 14 via link 21 which can be any suitable link such as a local area network (LAN) operating in accordance with Ethernet signaling protocols or any other suitable protocol. I/O and control sub-system 14 is coupled to intrinsic safety barrier 16 which in turn is coupled to process communication loop 18 to allow data communication between loop 18 and I/O and control sub-system 14 in a manner that limits energy passing therethrough.

In this illustration, process communication loop 18 is a FOUNDATION™ fieldbus process communication loop and is coupled to field devices 20, which are shown coupled to process communication loop 18 in a multi-drop configuration. An alternative process communication (or process control) loop (not shown) is an HART® process communication loop. The HART® protocol operates using the frequency shift keying (FSK) principle, which is based on the Bell 202 communication standard. The digital signal is made up from two frequencies—1200 Hz and 2200 Hz, representing bits 1 and 0, respectively. HART® installations can be operated in so-called point-to-point configurations as well as multi-drop configurations. FIG. 1 illustrates a multi-drop wiring configuration that vastly simplifies system wiring compared to other topologies such as the star topology. Multi-drop HART® configurations support a maximum of 15 devices, while multi-drop Fieldbus configurations support a maximum of 32 devices.

Intrinsically safe handheld field maintenance tool 22 is coupled to loop 18 as illustrated in FIG. 1. When coupled to a process control loop as shown, tool 22 can perform a number of the communication and diagnostic functions set forth in the co-pending parent application. In addition, tool 22 can couple to and interact with an HART process control loop (not shown) in much the same way the presently available HART Model 275 Communicator can. In order to comply with the various different dictates of the HART and FOUNDATION™ Fieldbus physical layer (PHY) transmit behavior, as well as complying with intrinsic safety requirements, separate network connections are provided on tool 22 for HART and Fieldbus connections.

FIG. 2 is a block diagram of a portion of device 22 in accordance with an embodiment of the present invention. Tool 22 includes three network connection terminals, two positive terminals (24A, 24C) and a single common terminal (24B) which form a pair of sets of network communication terminals. Positive terminal 24A and common terminal 24B are used to coupled tool 22 to a HART network. The other positive terminal (24C) and common terminal 24B are used to connect tool 22 to a FOUNDATION™ Fieldbus network. The separate network connections are used in order to facilitate compliance with intrinsic safety requirements and simultaneously comply with the different physical layer transmit behaviors of the HART and Fieldbus protocols. Compliance with intrinsic safety requirements means compliance with one or more portions of the standard promulgated by Factory Mutual Research in October, 1998, entitled APPROVAL STANDARD INTRINSICALLY SAFE APPARATUS AND ASSOCIATED APPARATUS FOR USE IN CLASS I, II AND III, DIVISION 1 HAZARDOUS (CLASSIFIED) LOCATIONS, CLASS NUMBER 3610.

When operating with a HART process control loop, tool 22 must not sink or source a direct current (DC). To meet this requirement, the HART physical layer circuit (also referred to as HART MAU) 26 is designed to impose a voltage signal on process control loop 18 in the same manner that the currently available HART Model 275 imposes such a voltage.

To meet the intrinsic safety requirement for FOUNDATION™ Fieldbus, tool 22 must not inject any energy into process control loop 18. To meet this requirement, the FOUNDATION™ Fieldbus physical layer circuit (also referred to herein as Fieldbus MAU 28) will sink a DC current (preferably using a shunt current regulator, for example) of approximately 20 mA and then during message transmission, modulate that current by approximately +/−8 mA. Because the two protocols have two fundamentally different (and conflicting) ways of communicating, the circuitry of tool 22 must never sink current in a HART process control loop nor inject energy (impose a voltage) in a FOUNDATION™ Fieldbus network.

Since tool 22 includes separate connections and media access circuits (26, 28) for the different process control loops, it is possible for a user to connect tool 22 to the wrong network (e.g. connect HART MAU 26 to a FOUNDATION™ Fieldbus network or vice versa). In order to deal with such an user error, tool 22 ensures that upon initial connection, the media access units (MAU's) remain passive and do not attempt to modulate the network media.

Tool 22 includes measurement circuits that consist of four measurement signal conditioning circuits, one for the HART MAU (26) and three for the Fieldbus MAU 28. In addition, both HART measurement circuit 30 and Fieldbus measurement circuits 32 have a circuit that can sink a small amplitude short duration current from the network. In this embodiment, the FOUNDATION™ Fieldbus measurement signal conditioning circuit 32 comprises three measurement conditioning circuits (collectively Fieldbus measurement circuit 32) that scale the voltage signal on the FOUNDATION™ Fieldbus network connector (24B, 24C) to measure DC voltage, communications signal amplitude, and network or loop noise. The HART measurement circuit 30 includes a circuit to measure the DC voltage on the network. These four signal conditioning circuits all feed control logic block 34. Control logic block 34 preferably includes a multiplexer that is connected to an analog-to-digital converter 36. Control logic block 34 is accessed by microprocessor 38 via 16-bit parallel bus 40.

In one embodiment, when tool 22 is first turned on, microprocessor 38 commands analog-to-digital converter 36 to alternately monitor the DC voltage on both the HART and Fieldbus network connection terminals. During this state, tool 22 will not disturb the network (also referred to herein as process control loop) in any way (i.e. sink/source current or impose a voltage). If there are no network connections, the voltage measured will be near zero on both loop connections. When one of the MAU terminals is connected to a loop (i.e. through connections 24A and 24B or 24C and 24B), a DC voltage will be measured on one MAU and not the other. A HART process control loop will cause a voltage between approximately 12 and 50 volts DC to be measured while a FOUNDATION™ Fieldbus loop connection will cause a voltage between approximately 9 and 32 volts DC to be measured. The mechanical design of the loop connection terminals is preferably selected such that it is impossible to connect both the HART and FOUNDATION™ Fieldbus media access units (MAU) 26, 28 to a process loop at the same time. This mechanical configuration ensures that if a DC voltage is measured on one media access unit, there will not be a DC voltage on the other.

Once a DC voltage is recognized, the polarity is measured to determine whether the loop connection leads are correctly connected. Specifically, if the DC voltage measured between common lead 24B and one of leads 24A and 24C has a negative polarity, that means that the loop connection leads are reversed. Microprocessor 38 then sends a message to the host processor (not shown) via Com-1 illustrated at 41 and the host processor will display a message informing the user that the loop connection must be reversed.

As indicated above, there is an overlap between the operating DC voltages used on both HART and Fieldbus process communication loops. Therefore, DC voltage alone cannot be used to reliably indicate the type of loop to which tool 22 is connected. To determine loop type, tool 22 actually measures the DC impedance of the process control loop (preferably having a reasonable DC voltage and correct lead polarity). Tool 22 measures network DC impedance by sinking 1 mA of current for a very short duration, such as 5 milliseconds. This disturbance generates a voltage pulse along the process control loop that is proportional to the DC impedance of the process control loop itself. There is a distinguishing range of impedance between HART and FOUNDATION™ Fieldbus process control loops. The signal that tool 22 observes in response to the disturbance it generates also contains any HART or FOUNDATION™ Fieldbus communication signals that may be present on the process control loop. The communication signals themselves are filtered using a suitable low-pass filter so that only the effect of the short-duration pulse is observed by tool 22.

Analog-to-digital converter 36 measures the amplitude of the associated disturbance. Analog-to-digital converter 36 measures the voltage amplitude of the associated disturbance. The impedance of the network can be computed from this voltage measurement. A FOUNDATION™ Fieldbus network will have a computed impedance of approximately 50 ohms. A HART® network will have a computed impedance greater than approximately 125 ohms. If the loop type detected is different than the media access unit (MAU) to which tool 22 is connected, the microprocessor 38 will send an error message to the host processor via Com1 (41) to tell the operator to change the network connection to the correct media access unit. If the network or process control loop type detected is the same as the media access unit of tool 22, then normal communications can proceed.

In this embodiment, while tool 22 is connected to a process control loop and communicating, tool 22 preferably can make several diagnostic measurements. For instance, microprocessor 38 can periodically measure the DC loop voltage to ensure that it remains correct and constant. Any significant variation in DC loop voltage would indicate a fault, or impending fault condition on the loop.

Preferably, the Fieldbus measurement circuits 32 provide additional measurement diagnostics for an operating network or process control loop. The AC measurement of the communications signal preferably has filters that enable the measurement of the amplitude of messages on the Fieldbus process control loop. A noise measurement circuit also measures AC voltage but has a lower frequency pass band and is optimized to measure the amplitude of 60 and 120 Hz noise.

As described above pursuant to various embodiments, tool 22 provides a number of important advantages over known intrinsically safe handheld field maintenance tools. Specifically, tool 22 can automatically detect a loop connection to a pair of loop connection terminals. Further, tool 22 can automatically detect when a loop connection is performed improperly to alert a user to reverse polarity. Further still, tool 22 is able to automatically detect the type of the process control loop to which it is coupled and suitably adapt its communication in response thereto.

Tool 22 can also provide a number of diagnostics for the loop to which to it is connected. Specifically, tool 22 can measure DC network voltage, signal amplitude (for FOUNDATION™ Fieldbus messages) and low-frequency noise amplitude. Further, with respect to FOUNDATION™ Fieldbus diagnostics, tool 22 is capable of measuring the amplitude of Fieldbus signal strength and isolate it to particular devices connected to the network. The user can therefore determine the health of devices connected to the FOUNDATION™ Fieldbus network or loop, or determine if a problem exists with the termination of the network. Further still, tool 22 can preferably perform the FOUNDATION™ Fieldbus diagnostics set forth in the parent application. Tool 22 is also able to preferably provide an indication related to the number of terminators present on a FOUNDATION™ Fieldbus network.

As illustrated in FIG. 2 in one embodiment, tool 22 is also preferably provided with memory, such as non-volatile memory 42 and volatile memory 44. The memory provided within tool 22 can be used to keep a log of all detected message errors as well as all retry queries. The errors can be correlated with specific process devices or receiver nodes on the process control loop. Information can be collected over time and will provide an effective indication of health of the loop as well as the connected nodes. In some embodiments, non-volatile memory 42 is flash memory and stores program instructions that facilitate higher level diagnostic functionality. Such higher level diagnostics include monitoring the control status of the loops operating in a FOUNDATION™ Fieldbus segment, and/or simulating a particular function block in a control loop in order to help trouble shoot other devices on the network.

FIG. 3 is a diagrammatic view of a method for preventing unsafe transmission on a process control loop with a multi-protocol intrinsically safe field maintenance tool. The method begins at block 100 where the technician first selects the network to which he/she thinks the tool is connected. For the purposes of illustration, a network type #1 is indicated as selected by the technician. Accordingly, at block 102 a tool 22 verifies that a network connection is available on the set of terminals which the technician has selected. At block 104, tool 22 checks the other set of network connection to determine if any voltage is present on the other set of terminals. If a voltage is observed on the other set of network terminals, the technician is warned of a possible mistake, as indicated at block 106, and the method returns to block 102. However, if no voltage, or a suitably low voltage is observed on the other set of network terminals, control passes to block 108, where voltage on the selected network terminals is measured. If the measured voltage on the selected network terminals is zero, a warning is also given to the technician indicating that the device may be connected incorrectly, as indicated at block 112, after which the method begins anew at block 102. If at block 110 a non-zero voltage is detected on the selected network terminals, device tool 22 enters a "listen" mode, as indicated at block 114, during which it listens for messages on the selected network in the format compatible for that type of network. If, at block 116, no network traffic of the selected type is detected, the technician is provided with a warning, as indicated at block 118, that tool 22 may be connected to the wrong type of network.

At block 120 the technician is given the option of communicating with tool 22 notwithstanding the error indication generated during block 118, in which case control passes to block 122 where communication on the selected type of network begins. If, at block 120, the technician indicates that communication is not desired, then the method begins anew at block 102. Note, that block 122 is also accessible via block 116 if suitable network traffic is found during block 116.

Preferably, tool 22 is configured to restart the method in the event that any of the leads of tool 22 become disconnected from the control loop. This ensures that undesirable communication/signaling will not occur even if a lead becomes disconnected, and a technician erroneously re-connects the tool to the loop. Thus, the methods described above will generally start, or re-start each time the tool recognizes a new lead connection.

Although the present invention has been described with reference to preferred embodiments, workers skilled in the art will recognize that changes may be made in form and detail without departing from the spirit and scope of the invention. While embodiments of the present invention have generally been described with respect to fieldbus and HART process communication loops, embodiments of the present invention are practicable with any plurality of distinct process control protocols for which physical layer differences can cause problems during a transmission state of any connected device.

What is claimed is:

1. A method of selectably communicating on a process communication loop with a multi-protocol handheld field maintenance tool having first and second sets of loop connection terminals, the method comprising:
   receiving a technician selection of a loop type corresponding to a loop type relative to the first set;
   measuring a voltage across the second set;
   providing a warning to the technician if a non-zero voltage is measured across the second set.

2. The method of claim 1, wherein the selected loop type is HART.

3. The method of claim 1, wherein the selected loop type is FOUNDATION Fieldbus.

4. A method of selectably communicating on a process communication loop with a multi-protocol handheld field maintenance tool having first and second sets of loop connection terminals, the method comprising:
   receiving a technician indication of a selected loop type corresponding to a loop type relative to the first set;
   measuring a voltage across the first set;
   providing a warning to the technician if a substantially zero voltage is measured across the first set.

5. The method of claim 4, wherein the selected loop type is HART.

6. The method of claim 4, wherein the selected loop type is FOUNDATION Fieldbus.

7. The method of claim 1, wherein the method is started when the tool is connected to a process communication loop.

8. A method of selectably communicating on a process communication loop with a multi-protocol handheld field maintenance tool having first and second sets of loop connection terminals, the method comprising:
   receiving a technician indication of a selected loop type corresponding to a loop type relative to the first set;
   measuring a first voltage across the second set;
   measuring a second voltage across the first set if the first voltage is substantially zero;
   listening to loop traffic if the measured second voltage accords with the technician indication; and
   communicating on the process control loop if network traffic is detected.

9. The method of claim 8, wherein the selected loop type is HART.

10. The method of claim 8, wherein the selected loop type is FOUNDATION Fieldbus.

11. The method of claim 8, wherein the method is started when the tool is connected to a process communication loop.

12. A method of selectably communicating on a process communication loop with a multi-protocol handheld field maintenance tool having first and second sets of loop connection terminals, the method comprising:
    receiving a technician indication of a selected loop type corresponding to a loop type relative to the first set;
    measuring a first voltage across the second set;
    measuring a second voltage across the first set if the first voltage is substantially zero;
    listening to loop traffic if the measured second voltage accords with the technician indication; and
    providing an error indication to the technician if no network traffic of the selected loop type is detected.

13. The method of claim 12, further comprising:
    allowing the technician to begin network communication notwithstanding the lack of traffic.

14. The method of claim 12, wherein the selected loop type is HART.

15. The method of claim 12, wherein the selected loop type is FOUNDATION Fieldbus.

16. The method of claim 12, wherein the method is started when the tool is connected to a process communication loop.

* * * * *